United States Patent
Melamed et al.

(10) Patent No.: US 9,731,319 B2
(45) Date of Patent: Aug. 15, 2017

(54) STRETCHABLE SHEETS COMPRISING A VARIETY OF LAYERS AND ZONES AND METHODS TO PRODUCE SUCH PRODUCTS

(75) Inventors: Reuven Melamed, Manchester (GB); Ehud Giloh, Manchester (GB)

(73) Assignee: TamiCare Ltd., Heywood (GB)

( * ) Notice: Subject to any disclaimer, the term of this patent is extended or adjusted under 35 U.S.C. 154(b) by 752 days.

(21) Appl. No.: 13/531,024

(22) Filed: Jun. 22, 2012

(65) Prior Publication Data

US 2012/0322333 A1    Dec. 20, 2012

Related U.S. Application Data

(63) Continuation-in-part of application No. 12/875,716, filed on Sep. 3, 2010, now Pat. No. 8,323,764, which
(Continued)

(51) Int. Cl.
| | | |
|---|---|---|
| B05D 1/14 | (2006.01) | |
| B05D 1/02 | (2006.01) | |
| B29C 70/30 | (2006.01) | |
| B05D 1/00 | (2006.01) | |
| B33Y 10/00 | (2015.01) | |
| B29C 41/08 | (2006.01) | |

(Continued)

(52) U.S. Cl.
CPC .............. *B05D 1/14* (2013.01); *B05D 1/00* (2013.01); *B05D 1/02* (2013.01); *B29C 41/08* (2013.01); *B29C 41/085* (2013.01); *B29C 70/30* (2013.01); *B33Y 10/00* (2014.12); *B33Y 70/00* (2014.12); *D06N 7/0097* (2013.01); *Y10T 428/23943* (2015.04); *Y10T 442/697* (2015.04)

(58) Field of Classification Search
CPC ......... B29C 41/08; B29C 70/30; B33Y 10/00; B33Y 70/00; D06N 7/0097; Y10T 428/23943; B05D 1/00; B05D 1/02; B05D 1/12; B05D 1/14
USPC ........... 428/90; 427/197, 180, 200, 203, 206
See application file for complete search history.

(56) References Cited

U.S. PATENT DOCUMENTS

| | | | |
|---|---|---|---|
| 2,527,501 A | | 10/1950 | Saks |
| 2,592,602 A | * | 4/1952 | Saks .................. B05D 1/16 |
| | | | 156/72 |

(Continued)

FOREIGN PATENT DOCUMENTS

| | | |
|---|---|---|
| CH | 682288 | 8/1993 |
| DE | 20 41 764 | 3/1971 |

(Continued)

OTHER PUBLICATIONS

International Searching Authority, International Search Report for PCT/IB2013/001807 mailed Dec. 10, 2013, 4 pages.

*Primary Examiner* — Cheryl Juska
(74) *Attorney, Agent, or Firm* — McDonnell Boehnen Hulbert & Berghoff LLP

(57) ABSTRACT

The invention provides methods for producing flexible, stretchable, and/or elastic sheets and products having two or more zone having different material features and performance. The products can be comprised of material such as natural elastomers and other synthetic polymers. The method for producing stretchable products by spraying product material of different types over different zones of a workpiece former or conveyor belt.

10 Claims, 2 Drawing Sheets

Related U.S. Application Data is a continuation of application No. 12/056,040, filed on Mar. 26, 2008, now Pat. No. 7,901,740, which is a continuation-in-part of application No. 11/268,684, filed on Nov. 7, 2005, now Pat. No. 7,767,133.

(60) Provisional application No. 60/625,480, filed on Nov. 5, 2004.

(51) Int. Cl.
  *B33Y 70/00* (2015.01)
  *D06N 7/00* (2006.01)

(56) References Cited

U.S. PATENT DOCUMENTS

| | | | |
|---|---|---|---|
| 2,691,611 A | 10/1954 | Saks | |
| 2,867,849 A * | 1/1959 | Drew | B29C 41/14 264/233 |
| 3,027,273 A | 3/1962 | Sacks et al. | |
| 3,032,774 A | 5/1962 | Wade | |
| 3,791,783 A | 2/1974 | Damon et al. | |
| 3,793,050 A * | 2/1974 | Mumpower, Jr. | 427/462 |
| 4,095,638 A | 6/1978 | Thompson et al. | |
| 4,102,964 A | 7/1978 | Ridgeway | |
| 4,223,101 A | 9/1980 | Fine et al. | |
| 4,539,396 A | 9/1985 | Yasui et al. | |
| 4,623,572 A | 11/1986 | Irrlitz et al. | |
| 4,808,458 A | 2/1989 | Watt et al. | |
| 5,138,719 A | 8/1992 | Orlianges et al. | |
| 5,338,565 A | 8/1994 | Shlenker et al. | |
| 5,359,735 A | 11/1994 | Stockwell | |
| 5,645,884 A | 7/1997 | Harlow et al. | |
| 5,961,757 A | 10/1999 | Trombetta et al. | |
| 6,645,884 B1 | 11/2003 | Yang et al. | |
| 6,649,116 B2 | 11/2003 | Stephenson et al. | |
| 6,699,419 B1 | 3/2004 | Kia et al. | |
| 6,890,475 B1 | 5/2005 | Hatjasalo et al. | |
| 6,987,210 B1 | 1/2006 | Giloh | |
| 7,354,424 B2 | 4/2008 | Giloh | |
| 7,767,133 B2 * | 8/2010 | Giloh | B29C 33/46 264/510 |
| 7,901,740 B2 | 3/2011 | Giloh | |
| 8,323,764 B2 * | 12/2012 | Giloh | B29C 41/08 428/90 |
| 2003/0197311 A1 | 10/2003 | Stephenson et al. | |
| 2004/0033334 A1 * | 2/2004 | Merovitz | A41D 19/0058 428/90 |
| 2004/0091504 A1 | 5/2004 | Hamann | |
| 2004/0209062 A1 | 10/2004 | Sebag | |
| 2005/0127578 A1 * | 6/2005 | Triebes | B29C 41/14 264/555 |
| 2005/0130522 A1 * | 6/2005 | Yang | D06N 3/0002 442/59 |
| 2005/0194713 A1 | 9/2005 | Erickson et al. | |
| 2005/0222543 A1 | 10/2005 | Shao et al. | |
| 2006/0113714 A1 * | 6/2006 | Giloh | B29C 33/46 264/517 |
| 2006/0143767 A1 * | 7/2006 | Yang | A41D 19/015 2/16 |
| 2007/0083980 A1 * | 4/2007 | Yang | A41D 19/0006 2/167 |
| 2008/0292788 A1 | 11/2008 | Giloh | |
| 2009/0035515 A1 | 2/2009 | Cecconi et al. | |
| 2010/0227520 A1 * | 9/2010 | Claasen | D06N 3/045 442/59 |
| 2010/0330324 A1 | 12/2010 | Giloh | |
| 2011/0008478 A1 | 1/2011 | Giloh et al. | |
| 2013/0267138 A1 * | 10/2013 | Claasen | D06N 3/045 442/59 |
| 2015/0272245 A1 * | 10/2015 | Khor | A41D 31/0016 2/21 |

FOREIGN PATENT DOCUMENTS

| | | |
|---|---|---|
| EP | 0 128 531 A2 | 12/1984 |
| EP | 0 557 625 B1 | 10/1999 |
| EP | 1 184 163 | 3/2002 |
| EP | 1 184 501 | 3/2002 |
| GB | 00509196 A | 8/1938 |
| GB | 00550391 A | 4/1941 |
| GB | 965 901 | 8/1964 |
| GB | 1 209 099 | 10/1970 |
| GB | 1 356 465 | 6/1974 |
| GB | 2 074 085 | 10/1981 |
| GB | 2 265 077 | 9/1993 |
| JP | 54143453 | 11/1979 |
| JP | 60063163 | 4/1985 |
| JP | 61093866 | 5/1986 |
| JP | 63274593 | 11/1988 |
| JP | 03099900 | 4/1991 |
| JP | 04040260 | 2/1992 |
| JP | 4294131 | 10/1992 |
| JP | 5305689 | 11/1993 |
| JP | 07171844 | 7/1995 |
| JP | 8-294930 | 11/1996 |
| JP | 2000-102987 | 4/2000 |
| JP | 2001-505965 | 5/2001 |
| JP | 01271273 | 10/2001 |
| JP | 2002-515356 | 5/2002 |
| JP | 2004-34354 | 2/2004 |
| WO | 92/10119 | 6/1992 |
| WO | 98/25747 | 6/1998 |
| WO | 99/59736 | 11/1999 |
| WO | 00/39215 | 7/2000 |
| WO | 01/58656 A1 | 8/2001 |
| WO | 2004/054775 | 7/2004 |
| WO | 2005/039467 | 5/2005 |
| WO | 2005/088005 A1 | 9/2005 |
| WO | 2006/092666 A2 | 9/2006 |
| WO | 2009118654 | 10/2009 |

\* cited by examiner

STRETCHABLE SHEETS COMPRISING A VARIETY OF LAYERS AND ZONES AND METHODS TO PRODUCE SUCH PRODUCTS

CROSS-REFERENCE

This application is a continuation-in-part of U.S. nonprovisional application Ser. No. 12/875,716, filed Sep. 3, 2010, now U.S. Pat. No. 8,323,764, which is a continuation of U.S. nonprovisional application Ser. No. 12/056,040, filed Mar. 26, 2008, now U.S. Pat. No. 7,901,740, which is a continuation-in-part of U.S. nonprovisional application Ser. No. 11/268,684 filed Nov. 7, 2005, now U.S. Pat. No. 7,767,133, which claims the benefit of U.S. provisional application Ser. No. 60/625,480 filed Nov. 5, 2004, the disclosures of which are incorporated herein by reference in their entirety.

FIELD OF THE INVENTION

The present invention relates to products and sheets such as two-dimensional and three-dimensional products and sheets, composed of flexible, stretchable and/or elastic materials such as natural elastomers and other synthetic polymers. The invention also relates to methods for layering additional material such as fibers, in order to make 2D and 3D stretchable and/elastic products.

BACKGROUND OF THE INVENTION

This application is an improvement to our pending U.S. patent application Ser. No. 12/875,716. Said application introduced a product produced by a method for producing a stretchable nonwoven sheet, comprising a stretchable material such as natural rubber and loose fibers on a workpiece former such as conveyor belt or mold. In this current application, we wish to introduce some new features to the products characteristics to further expand products utilizations and applications.

SUMMARY OF THE INVENTION

The present invention is related to methods for producing a variable layered sheet of stretchable, elastic or shape-retaining products, composed principally of materials such as resilient elastomers including, but not limited to, natural latex rubber or polyurethane, using variety of controlled spraying units for spraying the principal material or materials onto a surface of a wall such as a workpiece former. The resulting product is a sheet having at least two different zones unified within the sheet. The present invention is also directed to improved methods for preparing products having a single or double-sided surface coating of same or different types of loose fibers, and a method for generating same or different microporosity regions in such products.

The present invention discloses a sheet with different thicknesses, composites and structures in different areas. The creation of such sheet or fabric is very similar to "3D printing."

Creating nonwoven disposable fabric, by using the disclosed technology, is in fact 3D printing of fabric.

In one aspect, the invention provides sheets comprising two or more zones, wherein at least one zone is characterized by a different composite and features than one of the remaining zones; and the sheet is stretchable and non-woven.

In another aspect, the invention provides methods for producing a stretchable workpiece comprising applying one or more materials on a conveyor or a mold using different machines or compartment or different materials in different layouts so to produce a workpiece having two or more zones, wherein at least one zone comprises a different material feature than one of the remaining zones.

These and other embodiments of the invention will become apparent in light of the detailed description below.

BRIEF DESCRIPTION OF THE FIGURES

The following figures show examples for two possible embodiments of this invention.

DETAILED DESCRIPTION OF THE INVENTION

Figure 1:
FIG. 1 represents a section through a sheet of this invention, the sheet having two zones—Zone 1 (left) and Zone 2 (right). Each zone comprises three layers. The upper layer of both zones is made out of composite 1. The middle layer of Zone 1 is made out of composite 2, while the middle layer of zone 2 is made out of composite 3. The bottom layer of zone 1 is made out of composite 3, while the bottom layer of zone 2 is made out of composite 2.
Figure 2:
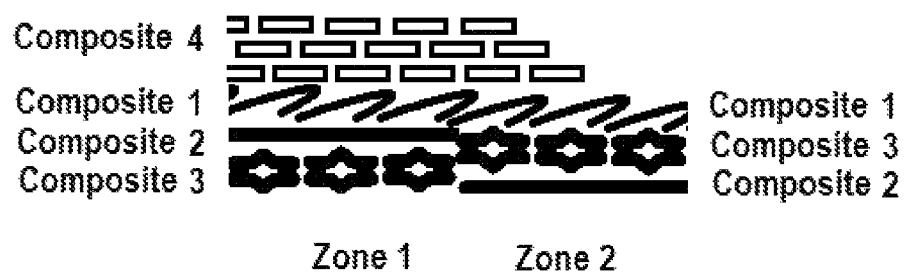
FIG. 2 represents a section through a sheet of this invention, the sheet having the same structure as described in FIG. 1, and further comprising additional layer of composite 4 built on top of the upper layer (composite 1) at a specific location, covering zone 1 in full but only part of zone 2. This specific structure creates differences in the thickness of the different areas of the sheet.

The present invention is generally related to stretchable, elastic or shape-retaining products composed of principal materials comprising resilient elastomers such as natural latex rubber, polyurethane or other synthetic materials, in a spray able liquid state, and methods for producing such products, using a controlled spraying of the liquid material onto a surface of a wall such as a workpiece former. The resulting product is a sheet having at least two different zones as desired. The present invention is also directed to products having a single or double-sided fiber flocked surface, and products such as non-woven sheets having desired level of porosity at each different zone, in order to gain breathability or permeability at the different zones of such products. The present invention is also directed to products produced by the inventive methods. The product produced by the invention has improved specifications and feeling on both sides of the product. The unified sheet allows the creation of a product with different performances at different areas, without the need to attach together different sheets of different materials.

The phrase 'unified within the sheet' means the composites of two zones adjacent one to the other, are blended at their connection lines, creating a continuous seamless sheet.

The term "flock" or "flocking" refers to the process of applying, attaching, or adhering loose fibers onto a surface.

The terms "former," "mould," or "workpiece former" are used interchangeably. A former or mould is an object made of any desired shape or size and serves as shape former for the making of products. For example, if a product in the shape of a face mask is desired, then a former or mould may be constructed that displays the shape and size of desired face mask. The former may be flat and two-dimensional such as a flat belt conveyor. Alternatively, the former may be three-dimensional and have a complex shape to which a workpiece substantially conforms. In addition, the former may be made of any suitable material such as metal (e.g., aluminium), porcelain, ceramic, plastics, or composite (e.g., metal and plastic).

The terms "product" and "workpiece" are used interchangeably and may also include any object that can be produced using the methods, apparatus, and formers of the invention. Stretchable, elastic products have a variety of uses including, without limitation, industrial use such as pipes, seals, membranes sheets, filtering membranes; food industry such as breathable stretchable wrappers or coverings for objects including perishables such as food; medical industry for medical products such as dressings and bandages; sanitation, athletic, and personal hygiene industries such as garments including protective garments and undergarments like brassieres, undershorts, socks, or gloves and any other garment, undergarment or dressing for veterinary or outdoor use. Other examples of garments are described in U.S. Ser. No. 10/723,244, filed Nov. 26, 2003, and in U.S. Ser. No. 09/744,779, filed Aug. 5, 1999, both of which are incorporated by reference in their entirety.

The phrase "loose fibers" refers to any suitable loose flocking fiber material including natural or synthetic materials and may be hydrophilic, hydrophobic, or a combination of the two. Hydrophilic fibers include wettable fibers, i.e., hydrophobic fibers that have been treated to render them hydrophilic, absorbent fibers, and superabsorbent polymer fibers. Examples of wettable fibers include bicomponent fibers, polypropylene fibers, and polyester fibers that have been treated, for example with surfactants. Example of wettable fibers are polyester fibers, such as DuPont-Akra Polyester Type 11A Bright commercially available from DuPont Company treated with a surfactant such as Tween 20 commercially available from ICI Americas Inc. Absorbent fibers are hydrophilic fibers. Absorbent fibers may comprise rayon fibers, acrylic fibers, nylon fibers, polyvinyl alcohol fibers, and fibers of natural or regenerated cellulosics. Example of absorbent fiber is rayon fibers. Superabsorbent polymer fibers are hydrophilic fibers that are swellable and capable of absorbing greater than about 5 grams per gram (of fiber weight) of 1% saline solution. Examples of superabsorbent polymer fibers are polyacrylate fibers, fibers of grafted cellulose, and fibers of maleic acid. Examples of superabsorbent polymer fibers include OASIS Type 101, commercially available from Technical Absorbents Limited and CAMELOT, commercially available from Camelot, Alberta, Canada. A preferred fiber for use in the invention is cotton fibers. Any suitable method for delivering the loose fibers so that they may be applied to the surface can be used. For instance, the loose fibers can be sprayed or blown onto the surface of the wall as well as electrostatically and or pneumatically flocked.

The phrase "product material" comprises suitable stretchable material such as natural or synthetic polymers. A natural polymer includes, without limitation, latex rubber. A synthetic polymer includes, without limitation, polyurethane. For spraying purposes, emulsions, suspensions, or solutions of the product material, e.g., liquid latex rubber, are generally used. After spraying the product material, with or without additional process steps, the product material is preferably allowed to dry before it is removed from a surface. The drying process may include curing or setting processes, depending on the choice of product material. For example, when latex rubber is used as the product material, the latex rubber would cure as it dries. In practicing this invention, the preferred product material is natural latex rubber, which forms durable, flexible, stretchable, elastic shape-retaining products.

The term "wall" may refer to a flat or two-dimensional work piece former such as a flat conveyor belt or any suitable shaped flat surface to which a product substantially conforms. Alternatively, the wall may be a three-dimensional workpiece former having a complex shape to which a workpiece substantially conforms. Alternatively, the wall may be non-flat, embossed or complex shaped conveyor belt, perforated conveyor belt, or combination thereof. The wall may be made of any suitable materials such as plastic, rubber, composite (e.g., of metal and plastic or ceramic), ceramics, metal such as aluminum or stainless steel.

The present invention provides a surprising and significant improvement over technologies known in the art by reducing the number of process steps and entailed costs. Moreover, the present invention provides a surprisingly effective and economical way to produce thin products, sheets and non-woven fabrics that combine different zones, which performs differently in the same unified sheet and may be flocked with fibers at least on one surface.

In one embodiment of the invention, a method is provided for producing a stretchable workpiece, said method comprising the steps of: (a) applying at least one type of wetting agent onto a surface of a wall; (b) applying a first layer of at least one type of loose fibers onto at least a portion of the surface of the wall to produce at a partially fiber-coated surface. The loose fibers are flocked electrostatically or by any other suitable way so that they hit the wall substantially perpendicular to its surface; and (c) spraying a liquid product material of at least one type onto the upright standing fibers to form a product material layer of predetermined thickness on the fiber-coated surface and produce a stretchable workpiece, wherein the product material layer has an inner and outer surface and fibers are attached to the inner surface of the product material layer. Another embodiment further comprises the step of applying a second layer of loose fibers onto at least a part of the outer surface of the product material layer, wherein the product material layer is uncured or partially uncured. In another embodiment, the method further comprises the steps of: allowing the product material layer to dry; and removing the stretchable workpiece from the surface.

The preceding methods may further comprise using different machine components or different materials in different configurations to produce zones of different qualities in the product.

For example, the method for producing a stretchable workpiece can comprise applying one or more materials on a conveyor or a mold at the same time using different machines or compartment or different materials in different layouts so to produce a workpiece having two or more zones, wherein at least one zone features a different material character than one of the remaining zones. Each material applied may be a liquid material as defined above.

In one embodiment at least two different spraying nozzles are used side by side in conveyor cross direction to spray material (e.g., liquid material) in parallel, so that one zone of the product will comprise lower density then the other part. Each nozzle may spray the same material or different materials.

The nozzles may be arranged in a row. For example, as arranged in a row, a first nozzle can spray at wider angle than a second nozzle to thicken a section of the product by providing thicker elastomeric layer.

In yet another embodiment, the nozzles are configured to apply at the same time the same or different materials in different rates so to control amount of material sprayed in the different areas.

In yet another embodiment, the nozzles are configured to apply at the same time the same or different materials in different rates so to control amount of material sprayed in the different areas and to create areas of different porosity.

Such nozzle arrays may be used, for example, in step (c) as described above to spray different product materials. For example, two different materials (different polymer types) may be sprayed in two or more zones at the same time. In another example, different materials (different colors) may be layered by applying a first material layer and then applying a second material layer over the first.

In yet another embodiment, at least two similar nozzles are used to spray different polymers, the polymers may differ in: polymer type, formulation or any property or feature, such as, but not limited to any mechanical property, viscosity, color, scents or any other desired feature.

In one example, the different polymers can be selected independently from natural rubber, high modulus natural rubber, low modulus natural rubber, polyurethane, silicones, and the like.

In another embodiment, the polymer applied to one of the zones of the product has a higher modulus than the polymer applied to at least one other zone. In another embodiment, the polymer applied to a first zone of the product has a higher modulus than the polymer applied to a second zone.

In yet another embodiment, at least two flocking machines are used to apply different types of fibers. Such flocking machines may be used, for example, in step (b), as described above, to apply different types of loose fibers, to the different zones of the product. For example, different types of fibers may be applied to the wetting agent in adjacent zones or one type of fibers may be applied to the wetting agent (one surface of the product material layer), and a second type of flock applied over the second surface of the product material layer.

In yet another embodiment, at least two flocking machines are used to apply different fibers, the fibers may differ in type, material, length, diameter, color, odor, compostability, water retention, hydrophobicity or any other desired feature.

When different flocks are applied in two or more zones, the flock may be sprayed on top of the same product material or different product material. In one embodiment, different flocks are applied to at least two different zones and the flocks are sprayed onto the same product material. In another embodiment, different flocks are applied to at least two different zones and each type of flock is sprayed onto a different product material.

In another embodiment, the wetting agent is coated with a first flock, the first flock is sprayed onto one or more product materials in one or more zones, and a second flock is applied to the outer surface of the product material.

The preceding methods may be used to form unified stretchable non-woven sheets having two or more zones, wherein at least one zone has a different feature than one of the remaining zones.

In certain embodiments, the stretchable non-woven sheets may comprise three or more zones; or four or more zones; or five or more zones. In other embodiments, the stretchable non-woven sheets may comprise two to ten zones; or two to five zones; or two to four zones; or two or three zones. In yet other embodiments, the stretchable non-woven sheets can have two zones; or three zones; or four zones; or five zones; or as many zones as necessary for a given purpose. All zones produced as a unified sheet.

Each of the zones of the stretchable non-woven sheets can be, for example, but not limited to (1) the upper surface and the bottom surface; (2) the right side and the left side; (3) a longitudinal, middle portion and the remaining side parts; (4) cross direction stripes; or any other desired zone definition or combination thereof.

In one embodiment the product zones each comprise different elastomeric materials, such as, but not limited to, natural latex rubber, polyurethane or other synthetic materials.

The material features of each of the zones may differ in any property or, such as, but not limited to, polymer type, formulation, compostability, basis weight, thickness, porosity, water or any other liquid permeability, breathability, tear strength, elongation at break, retractive force after extension, tensile strength, any other mechanical property, color, odor, tactile, or feel.

In another embodiment, the stretchable non-woven sheet comprise different loose fibers, at different zones, the fibers may differ in type, material, length, diameter, color, odor, compostability, water retention, hydrophobicity or any other desired feature.

In yet another embodiment, the product zones comprise different porosity levels.

In particular examples, the sheet may comprise a first zone having a first material and first flock and a second zone, adjacent to the first zone, having the first material and a second flock. In another example, the sheet may comprise a first zone having a first material and first flock; a second zone, adjacent to the first zone, having the first material and a second flock; and a third zone, adjacent to the first or second zone, having a second material and the first flock.

In another example, layers may be sprayed one on top of the other, such that a sheet may comprise adjacent zones each where the stacks of applied layers are different in each zone. That may get different sandwiches side by side unified on the same sheet.

In another example, at least one of the zones of the sheet may comprise a polymer having a different modulus from the polymer of the remaining zones. Such sheets can be useful for medical usage to provide a bandage having different local pressure requirements.

In another example, different materials may be using in different zones to create a "breathable" area in the sheet; or an improved leak proof area.

In another example, different fibers may be applied to the inner and outer surfaces of a sheet, such as providing cotton fibers to the inner surface and artificial fibers to the outer surface. Such sheets may be useful, for example, in manufacturing pants or other garments.

In another example, different zones may be provided with different colored flock. Such different colors may be applied in adjacent zones on one surface of the sheet to produce a desired design effect; or one color flock may be provided to an inner surface of the sheet and another color flock to the outer surface of the sheet.

The methods and products provided herein can be used in the non-woven industry, as a sheet of stretchable non-woven fabric to be used as is, or in combination with other materials such as, but not limited to, woven and non-woven fabrics, to create finished ready to use products such as, but not limited to, diapers, sanitary napkins, bandages, packaging means, beddings upholsteries, curtains, apparels, outdoor and military accessories and the like.

It will be appreciated by persons skilled in the art of that the present invention is not limited by what has been particularly shown and described hereinabove. Rather the scope of the present invention includes variations and modification of the various features described in the specification and shown in the drawings which may occur to a person of ordinary skill in the art upon reading the foregoing description and which are not in the prior art.

What is claimed:

1. A method for producing a unified flocked sheet or product having at least two different adjacent stacked zones with blended connection lines, each stacked zone having a different structure, said method comprising:

providing a wall of a conveyor;

providing one or more controlled spraying units and one or more flocking machines, wherein the spraying units comprise nozzles, the nozzles arranged side by side in a cross direction of the conveyor and configured to apply a liquid polymer or a wetting agent, and wherein the flocking machines are configured to apply loose fibers;

applying at least an initial or bottom layer of at least two different materials selected from a liquid polymer or loose fibers at the same time onto different regions of a surface of the wall of the conveyor to produce the initial or bottom layer having at least two different adjacent zones using the one or more spraying units and the one or more flocking machines;

applying at least a second or top layer of at least two different materials selected from a liquid polymer or loose fibers at the same time onto said at least two different adjacent zones of said initial or bottom layer using the one or more spraying units and the one or more flocking machines so as to produce a seamless, unified sheet or product having at least two different adjacent stacked zones, each stacked zone having a different structure, wherein each structure comprises a stack of applied layers, wherein the at least two different adjacent stacked zones have connection lines that are blended, wherein each stacked zone has a top layer and a bottom layer; and allowing the sheet or product to dry prior to removal from the wall, wherein the at least two different adjacent stacked zones created at the same time differ in:

(a) polymer composition and character;
(b) polymer layer thickness;
(c) polymer layer porosity;
(d) flocked fiber composition, character, size, or amount;
(e) location of flocked fibers on the top layer of the zone, bottom layer of the zone, or both the top/bottom layers of the zone;
(f) number of applied layers; or
(g) order of applied layers.

2. The method according to claim 1, wherein the polymer composition and character comprises polymer tensile strength, tear resistance, color, odor, tactile feel, or compostability.

3. The method according to claim 1, wherein the fiber composition, character, size or amount differences comprise fiber length, diameter, color, or hydrophobic/hydrophilic character.

4. The method according to claim 1, wherein the nozzles are configured to apply at the same time the liquid polymer at different rates so to control the amount of the liquid polymer sprayed in the different zones or to create areas of different porosity.

5. The method according to claim 1, wherein the at least two different spraying nozzles are used to spray at the same time different liquid polymers to form different polymer layers.

6. The method according to claim 5, wherein the different polymer layers differ in polymer type, compostability, thickness, porosity, water or any other liquid permeability, breathability, tear strength, elongation at break, retractive force after extension, tensile strength, color, odor, or tactile feel.

7. The method according to claim 1, wherein at least two flocking machines are used to apply different loose fibers.

8. The method according to claim 1, wherein the unified sheets or products comprises three or more stacked zones, four or more stacked zones, or five or more stacked zones.

9. The method according to claim 1, wherein when the loose fibers are applied to at least one region of the surface of the wall to form the initial or bottom layer, the method further comprises applying a wetting agent onto the at least one region of the surface of the wall prior to applying the loose fibers so as to temporarily hold the fibers onto the wall surface.

10. The method according to claim 9, wherein the liquid polymer is applied on top of the fibers on the wall.

* * * * *